United States Patent [19]
Goedken et al.

[11] Patent Number: 5,122,722
[45] Date of Patent: Jun. 16, 1992

[54] BATTERY CHARGING SYSTEM

[75] Inventors: Terrance J. Goedken, Schaumburg, Ill.; James F. Goedken, Dubuque, Iowa

[73] Assignee: Motorola, Inc., Schaumburg, Ill.

[21] Appl. No.: 642,483

[22] Filed: Jan. 17, 1991

[51] Int. Cl.$^5$ .............................................. H02J 7/00
[52] U.S. Cl. ...................................... 320/22; 320/31; 320/35; 320/39
[58] Field of Search ................... 320/21, 15, 39, 40, 320/22, 23, 35, 36, 31

[56] References Cited
U.S. PATENT DOCUMENTS

| | | | |
|---|---|---|---|
| 4,670,703 | 6/1987 | Williams | 320/22 |
| 4,849,682 | 7/1989 | Bauer et al. | 320/15 |

Primary Examiner—R. J. Hickey
Attorney, Agent, or Firm—Robert H. Kelly

[57] ABSTRACT

A battery charging system for a multi-cell battery charger operative to apply a charging current to one or more battery packs, each comprised of one or more battery cells. Initiation of application of a fast charging current is permitted only when the voltage levels taken across output terminals of a battery pack positioned at the battery charger, and the ambient temperature of such battery pack, is within desired ranges. After initiation of application of the fast charging current, the ranges of voltage and ambient temperature levels within which application the fast charging current is permitted are expanded to prevent termination of application of the fast charging current responsive to transient changes of the temperature and voltage levels.

19 Claims, 5 Drawing Sheets

BATTERY CHARGING SYSTEM

BACKGROUND OF THE INVENTION

The present invention relates generally to battery charging systems, and, more particularly, to a battery charging system, and associated method therefor, for initiating fast charging of a battery.

Powering of an electrical device requires the device to be supplied with electrical power of levels sufficient to effectuate the operation thereof. In many instances, the power required to operate the electrical device is supplied by one or more batteries electrically coupled to the electrical device. The use of a battery to power the electrical device is necessitated, in some instances, to permit operation of the electrical device when the electrical device is not, or cannot be, positioned proximate to a permanent power supply. In other instances, the electrical device is powered by the battery to increase the portability of the electrical device.

When the electrical device is powered by a battery, the period of time during which the electrical device may be operated is limited by the energy storage capacity of the battery. A battery stores only a finite amount of energy, and such energy stored by the battery is utilized to power the electrical device during operation thereof. As the battery is utilized to power the electrical device, the stored energy of the battery is depleted, and the battery becomes discharged. Once the battery becomes discharged, replacement of the battery is required to permit continued operation of the electrical device.

A portable or transportable radiotelephone is one such electrical device which is commonly powered by a battery. Operation of the radiotelephone to transmit or to receive a modulated, information signal requires power levels of up to three watts to be supplied to the radiotelephone. Commercially available batteries constructed to power such a portable or transportable radiotelephone at such a power level store amounts of energy to permit operation of the radiotelephone at such a power level for approximately one hour. If the battery is not initially fully charged, the operational period during which the radiotelephone may be operated, is, of course, commensurately reduced.

Once a battery has been discharged beneath a certain level, responsive to powering of the radiotelephone or otherwise, the battery coupled to power the radiotelephone must be removed and replaced with another battery to permit continued operation of the radiotelephone.

Commercially available, rechargeable batteries have been developed which may be recharged to be reused thereafter to power again an electrical device. Rechargeable battery constructions, are, for example, commercially available for use with portable and transportable radiotelephones. One such rechargeable battery may be recharged, and reused, up to, or even in excess of, five hundred times.

Typically, a rechargeable battery construction, although generically referred to as a battery, is actually comprised of a number of individual battery cells which are connected theretogether to generate desired, output voltages and currents. The battery cells are housed within a housing wherein the housing, together with the plurality of battery cells, is referred to as a "battery pack". For purposes of simplicity, such constructions are many times referred to simply by the term "battery". The instant disclosure utilizes such terminology except when, and as shall be noticed hereinbelow, the more precise terminology is required.

Battery charging apparatus is similarly commercially available to permit recharging of one or more such rechargeable batteries. A battery charger is typically comprised of a support structure for supporting one or more batteries, and apparatus for supplying a charging current for charging the batteries when suitably positioned upon the support structure. The rechargeable battery may be recharged responsive to application thereto of a charging current generated by the current source for a period of time. The time period required to charge fully the rechargeable battery is dependent upon the battery type, the extent to which the battery has been discharged, and the magnitude of the charging current applied to the batteries.

Certain battery charging constructions supply a relatively small magnitude current (such as, for example, a C/10 value wherein C is defined to be the one-hour capacity of a battery) to the batteries, and other battery charging constructions supply a significantly larger current (such as, for example, a C value) to the batteries. Application of the large magnitude current to the batteries is referred to as fast charging of the batteries. Application of the small magnitude current to the batteries is referred to as trickle charging of the batteries. Several battery charging constructions permit the application of either the large current (i.e., the fast charging current), or the relatively small current (i.e., the trickle charging current) to be applied to the battery to recharge the battery thereby.

When a large magnitude charging current is applied to the battery to recharge the battery thereby, the time required to recharge the rechargeable battery is less than the time required to recharge the same rechargeable battery when a small magnitude charging current is applied to the battery. Therefore, for reasons of convenience, charging of a rechargeable battery through application of a fast charging current thereto is advantageous. However, the rechargeable battery must be of a construction to permit application of a fast charging current thereto. A rechargeable battery comprised of a nickel-cadmium (Ni-Cd) material constitutes one type of rechargeable battery construction which may be recharged by the application of a fast charging current thereto.

Even when the rechargeable battery is constructed of a nickel-cadmium material, or some other such material which may be recharged by the application of a fast charging current thereto, care must be exercised to ensure that application of the fast charging current to the battery does not cause the battery to become damaged. For instance, when a fast charging current is applied to a rechargeable battery, a portion of the energy of the charging current is converted into heat energy. Such conversion results in an elevation of the battery temperature. If the ambient temperature of the battery is initially (prior to application of the charging current) above a maximum level, the heat energy generated during application of the fast charging current to the rechargeable battery can cause damage to the battery. Therefore, when the ambient temperature level of the battery is above a maximum value, the fast charging current should not be applied to the battery to recharge the battery. A trickle charging current may, however, normally be applied to the rechargeable battery even when the temperature level of the battery is too high to apply a fast charging current thereto because the magnitude of heat energy generated during application of a trickle charging current to the rechargeable battery does not result in a significant temperature increase of the battery.

Conversely, when the ambient temperature level of the battery is below a minimum value, application of the fast charging current to the rechargeable battery can also cause damage to the battery. Therefore, fast charging current should not be applied to the battery when the ambient temperature of the battery is beneath a minimum value.

Additionally, damage can also occur to the rechargeable battery when a fast charging current is applied to a battery which has been discharged beneath a minimum level. A trickle charging current, however, may be applied to such a deeply discharged battery.

Still further, when the voltage across the rechargeable battery is above a maximum value, a fast charging current should not be applied to the rechargeable battery. Again, a trickle charging current may be applied to the rechargeable battery without risk of damage to the battery.

The voltage levels taken across the battery and the ambient temperature of the battery may be measured prior to initiation of application of a fast charging current thereto. If the measured voltage levels are not beneath a maximum voltage level or above a minimum voltage level, application of the fast charging current to the battery should be prevented. Similarly, if the measured temperature levels are not beneath a certain maximum temperature level, and above a certain minimum temperature level, application of a fast charging current to the battery should similarly be prevented.

Such broad restrictions can, however, needlessly limit the times in which a fast charging current may be applied to a battery to recharge the battery. For instance, the ambient temperature level of a battery may be above a maximum level as a result of exposure of the battery for an extended period of time to direct sunlight. Relocation of the battery to a battery pocket of a battery charger may remove the battery from the exposure to the direct sunlight, but the ambient temperature level of the battery may not be reduced for a period of time. An indication of the ambient temperature level of the battery above the maximum temperature level may prevent the application of the fast charging current to the battery. However, relocation of the battery away from the direct sunlight, will result in a decrease in the ambient temperature level of the battery. Initial measurement of the temperature level of the battery prior to initiation of application of the fast charging current may prevent the application of the fast charging current. Conventionally, when the measured temperature and/or voltage levels of a battery positioned to be recharged is beyond an allowable range, application of a fast charging current is not initiated, and a trickle charging current is applied to the battery to recharge the battery thereby, even after the temperature and/or voltage level of the battery changes to be within the allowable range.

Additionally, if the voltage level across the battery is of a level close to the maximum or minimum allowable level, or if the ambient temperature level of the battery is of a value close to the maximum or minimum allowable level, application of the fast charging current to the battery may cause the minimum or maximum allowable levels to be exceeded. Conventionally, when the voltage and/or temperature level of a battery undergoing application of a fast charging current thereto exceeds maximum or minimum temperature and/or voltage levels, application of the fast charging current is immediately terminated.

In either situation, application of a fast charging current to the battery to recharge the battery thereby would not cause damage to the battery. Because initial measurement of the voltage level and/or temperature level of the battery is beyond allowable limits, application of a fast charging current to the battery is not initiated, or application of the fast charging current to the battery is terminated, after initiation, as a result of the temperature level and/or voltage level of the battery exceeding the allowable limits, even when such temperature level or voltage level changes are only transient.

What is needed, therefore, is a battery charging system which permits application of a fast charging current to a rechargable battery when the battery characteristics are within allowable limits to permit fast charging of the battery, and which continues application of the fast charging current even when the battery characteristics exceed the allowable limits by a predetermined amount during charging thereof.

SUMMARY OF THE INVENTION

The present invention advantageously provides a battery charging system for charging a rechargeable battery pack having at least one battery cell.

The present invention further advantageously provides a battery charging system for initiating application of a fast charging current to the battery cells of a rechargeable battery pack when the temperature level and the voltage level of the battery cells are within a desired range.

The present invention further advantageously provides a method for charging a rechargeable battery pack having at least one battery cell.

In accordance with the present invention, a battery charging system for charging a battery pack having at least one battery cell is disclosed. At least one battery characteristic of the at least one battery cell of the battery pack is measured. Responsive to application of a control signal thereto, a charging current of either of at least one magnitude is applied to the at least one battery cell. Control circuitry generates the control signal to control thereby the magnitude of the charging current applied to the at least one battery cell of the battery pack. The control signal is generated: to cause application of the charging current of a first magnitude when the at least one battery characteristic is within a first predetermined range; to cause application of the charging current of a second magnitude when the at least one battery characteristic is beyond the first predetermined range and the at least one battery cell is less than fully charged; and to change the magnitude of the charging current applied to the at least one battery cell from the second magnitude to the first magnitude when the at least one battery characteristic alters in value to be within the first predetermined range and the battery cell is less than fully charged.

BRIEF DESCRIPTION OF THE DRAWINGS

The present invention will be better understood when read in light of the accompanying drawings in which.

DETAILED DESCRIPTION OF THE PREFERRED EMBODIMENT

Figure 1:
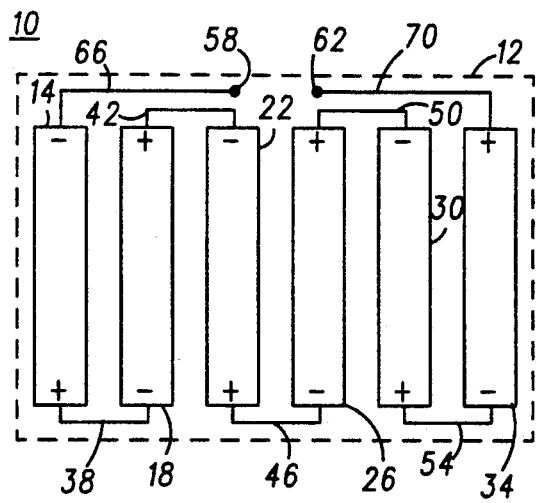
FIG. 1 is a partial circuit, partial schematic diagram of a battery pack formed of six discrete battery cells connected in a series connection therebetween.

Referring first to the partial circuit, partial schematic diagram of FIG. 1, there is shown a battery pack, referred to generally to by reference numeral 10. Battery pack 10 is comprised of housing 12 which is of a construction to permit supportive housing of a plurality of battery cells therewithin. As illustrated, battery pack 10 includes six battery cells 14, 18, 22, 26, 30 and 34. Battery cells 14-34, as described hereinabove, may be recharged by application of a fast charging current thereto, and are preferably comprised of a nickel-cadmium material. Battery cells of a battery pack, similar to battery pack 10, may be recharged by the battery charging system of the present invention.

As indicated in the figure, each battery cell 14-34 is bipolar in construction to form a cathodic portion (indicated by a plus sign at first sides of each of the cells 14-34), and an anodic portion (indicated by a minus sign at second sides of each the cells 14-34).

A first side of battery cell 14 is coupled to a second side of battery cell 18 by connector 38; a first side of battery cell 18 is coupled to a second side of battery cell 22 by connector 42; a first side of battery cell 22 is coupled to a second side of battery cell 26 by connector 46; a first side of battery cell 26 is coupled to a second side of battery cell 30 by connector 50; and a first side of battery cell 30 is coupled to a second side of battery cell 34 by connector 54. Output terminals 58 and 62 are coupled to sides of battery cells 14 and 34 by connectors 66 and 70, respectively. Output terminals 58 and 62 form electrical contacts suitable for connection to an electrical device to power the device with the stored energy of cells 14-34 of battery pack 10. Output terminals 58-62 similarly form contacts suitable for connection to a charging current source to provide battery cells 14-34 with a charging current to recharge the battery cells thereby.

Battery packs comprised of other numbers of battery cells and/or other connections between the battery cells (e.g., parallel connections or combinations of series and parallel connections between the battery cells) may be constructed. The number of battery cells (as well as their respective connections therebetween) is dependent upon the construction of the battery cells utilized to form the battery pack and the voltage and current output requirements of the battery pack.

When battery cells 14-34 of FIG. 1 are comprised of a nickel-cadmium material and configured as shown in housing 12 to form battery pack 10, a potential difference of nine-ten volts may be formed across terminals 58 and 62 when each cell 14-34 is fully charged. A battery pack formed of rechargeable Ni-Cd battery cells and configured in a manner similar to battery pack 10 of FIG. 1 is utilized to provide power to operate a portable or transportable radiotelephone.

Figure 2:
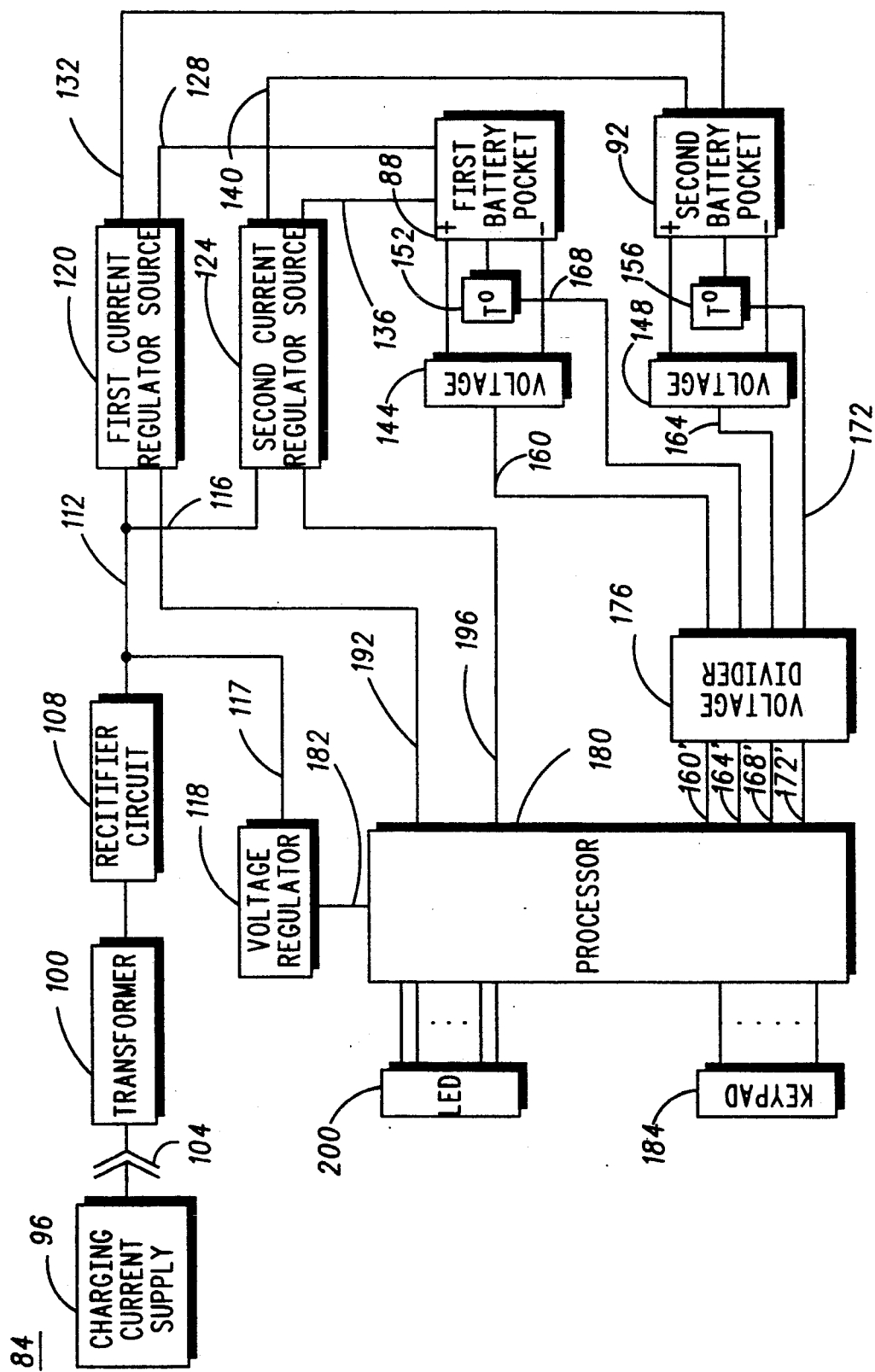
FIG. 2 is a block diagram of a circuit which embodies the battery charging system of the preferred embodiment of the present invention.

Turning now to the block diagram of FIG. 2, a circuit, referred to generally by reference numeral 84, which embodies the battery charging system of the present invention is shown. Circuit 84 measures both the voltage level taken across of the battery cells of a battery pack positioned to be recharged, and the ambient temperature level of the battery cells of the battery pack. (In the preferred embodiment, as illustrated, two battery packs may simultaneously be positioned to be recharged, and the temperature of and voltage levels across the battery cells of both battery packs are measured.) Responsive to such measurements, initiation of application of a fast charging current to the battery pack is permitted or prevented.

The battery charging system embodied by circuit 84 prevents initiation of application of the fast charging current to the battery cells of the battery packs when either the measured temperature levels or the measured voltage levels of the battery cells of the battery pack are beyond allowable levels. When the voltage and/or temperature levels change to be within the allowable levels, initiation of application of the fast charging current is permitted. Repeated initiation and termination of application of the fast charging current is avoided, as once the application of the fast charging current is initiated, the allowable levels of voltage and/or temperature levels within which fast charging of the battery cells of the battery pack is permitted are altered. Transient changes in battery temperature and/or voltage levels caused by initiation of application of the fast charging current thereto do not thereby cause termination of application of the fast charging current.

It is to be noted, that while battery charging system 84 of FIG. 2 illustrates a battery charging system for battery charging apparatus constructed to permit recharging of two battery packs (such battery charging apparatus is frequently referred to as a two-pocket battery charger), the battery charging system of the present invention may be similarly utilized by battery charging apparatus containing greater numbers (or fewer numbers—namely, one) of battery pockets. Therefore, while battery charging system 84 of FIG. 2 comprises first battery pocket 88 and second battery pocket 92, the battery charging system of the present invention may be also utilized with a battery charger of other constructions.

Pockets 88 and 92 are electrically connected, as will be described in greater detail hereinbelow, to receive current generated by charging current supply 96. Supply 96 may be comprised, for example, of a conventional, AC power supply, such as a power supply formed by a conventional, household, electrical outlet. Charging current supply 96 may, alternately, be comprised of a DC power supply, such as an automobile battery and/or generator.

A primary side of transformer 100 is coupled to receive the current of charging current supply 96. When charging current supply 96 is comprised of the conventional, household, electrical outlet, transformer 100 is connected to the supply 96 by conventional, pronged connectors suitable for insertion into the electrical outlet. Such connection is indicated in the figure by connector 104. When charging current supply 96 is comprised of an automobile battery/generator, connector 104 may, for example, be comprised of a plug suitable for insertion into a cigarette lighter socket of an automobile passenger compartment.

In embodiments in which battery charging system 84 is supplied with an alternating-current, charging current supply, a secondary side of transformer 100 is coupled to rectifier circuit 108. Rectifier circuit 108 rectifies, and preferably, additionally converts the rectified signal to a DC signal. When charging current supply 96 is comprised of a DC source, such as, for example, the automobile/generator, transformer 100 and rectifier circuit 108 may not be required.

The rectified signal generated by rectifier circuit 108 is supplied on lines 112 and 116 to first and second current regulators 120 and 124, respectfully, and on line 117 to voltage regulator 118. (When neither transformer 100 nor rectifier circuit 108 are required, the charging current generated by current supply 96 may be directly coupled to regulators 120 and 124, and voltage regulator 118.)

First current regulator 120 generates a current of a first magnitude, here of a magnitude corresponding to the magnitude of a fast charging current, on lines 128 and 132 which are coupled to terminals formed at first and second battery pockets 88 and 92, respectfully. Second current regulator 124 generates a current of a second magnitude, here of a magnitude corresponding to the magnitude of a trickle charging current, on lines 136 and 140 which are similarly coupled to terminals formed at first and second battery pockets 88 and 92, respectfully. Suitable grounding circuitry is, of course, also included to form a closed-loop, electrical circuit when a battery pack is suitably positioned at pocket 88 or 92.

The fast charging current generated by first current regulator 120 on lines 128 and/or 132 is applied to the battery cells of a battery pack suitably positioned at battery pocket 88 and/or 92, respectively, such that output terminals of the battery pack (such as output terminals 58 and 62 of battery pack 10 of FIG. 1) are electrically connected to terminals formed at the battery charging pocket. Application of the fast charging current to the battery cells of the battery pack recharges the battery in a relatively short period of time.

The trickle charging current generated by second current regulator 124 on lines 136 and 140 may similarly be applied to the battery cells of a battery pack when similarly suitably positioned at battery pocket 88 and/or 92, respectively. Application of the trickle charging current to the battery pack recharges the battery cells over an extended period of time.

Voltage measuring apparatus 144 is appropriately coupled across the terminals of first battery pocket 88 to permit measurement of voltage levels across output terminals of a battery pack (such as across output terminals 58 and 62 of battery pack 10 of FIG. 1) when the battery pack is suitably positioned at pocket 88. Similarly, voltage measuring apparatus 148 is appropriately coupled across the terminals of second battery pocket 92 to permit measurement of the voltage across output terminals of a battery pack suitably positioned at pocket 92.

Additionally, temperature measuring apparatus 152 is positioned proximate to first battery pocket 88 to permit measurement of the temperature of a battery pack positioned at first battery pocket 88. Similarly, temperature measuring apparatus 156 is positioned proximate to second battery pocket 92 to permit measurement of the temperature of a battery pack positioned at the pocket 92.

Signals indicative of the voltage levels measured by voltage measuring apparatus 144 and 148 are generated on lines 160 and 164, respectively. Signals indicative of temperature levels measured by temperature measuring apparatus 152 and 156 are generated on lines 168 and 172, respectively. Lines 160-172 are coupled to voltage divider circuit 176 which is operative to convert the values of the signals supplied thereto on the lines 160, 164, 168, and 172 into corresponding signals on line 160', 164', 168' and 172' of signal levels suitable for input to processor 180.

Processor 180 additionally receives input signals generated by keypad 184, and processor 180 is powered by the voltage regulated signal generated by voltage regulator 118 on line 182. Processor 180 may, of course, receive additional input signals generated by other sources to perform other functions.

Processor 180 generates output signals on lines 192 and 196 which are coupled to first and second current regulators 120 and 124, respectfully. The value of the signal generated on line 192 is determinative of when the current generated on lines 128 and/or 132 is supplied to battery pocket 88 and/or 92. Similarly, the value of the signal generated on line 196 is determinative of when the current generated on lines 136 and/or 140 is supplied to battery pocket 88 and/or 92. Processor 180 additionally generates other output signals, including, for example, output signals to power indicating the devices such as light emitting diodes 200.

Figure 3:
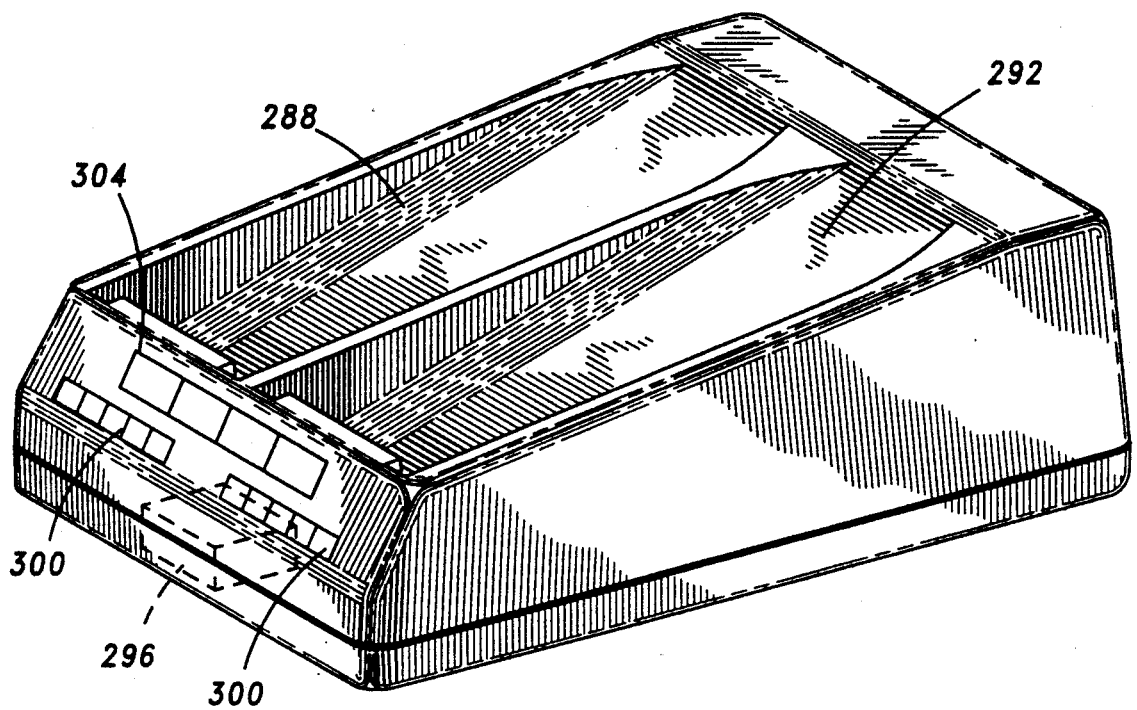
FIG. 3 is an isometric view of a battery charger constructed according to the teachings of the present invention of which the circuit of FIG. 2 forms a portion thereof.

Turning now to the isometric illustration of FIG. 3, a battery charger, referred to generally by reference numeral 280, which employs the battery charging system of the present invention is shown. Battery charger 280 includes two battery charging pockets 288 and 292 which correspond to first and second battery pockets 88 and 92 of the block diagram of FIG. 2. Charging pockets 288 and 292 are formed upon a top surface of the housing of battery charger 280. While not shown in the figure, electrical terminals are also formed at each of the battery pockets. Other portions of the circuit of FIG. 2 may be supported within the housing of charger 280. Block 296, shown in hatch, indicates the positioning of such portions of the circuit of FIG. 2 within the supportive housing of charger 280. Light emitting diodes 300, which correspond to light emitting diodes 200 of FIG. 2, and keypad 304, which corresponds to keypad 184 of FIG. 2, are additionally shown in the figure to be positioned upon a face surface of the housing of charger 280.

While not illustrated in the isometric view of FIG. 3, suitable connections are formed between charging pockets 288 and 292, light emitting diodes 300, keypad 304, and the remaining portions of the circuit of FIG. 2, as represented by block 296, to complete the circuit of FIG. 2.

Figure 4:
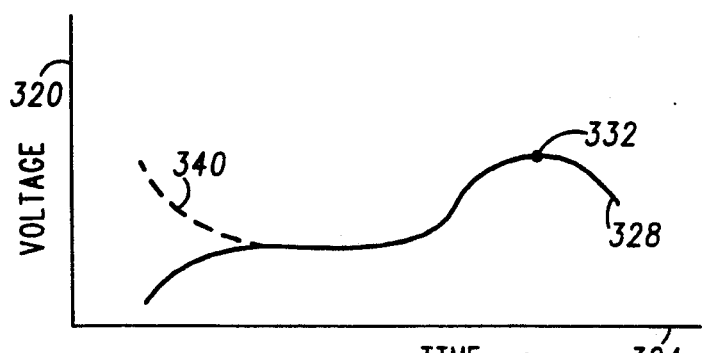
FIG. 4 is a graphical representation of a typical battery charging curve wherein voltage measured across output terminals of the battery cells of a battery pack during charging thereof is plotted as a function of time.

Turning now to the graphical representation of FIG. 4, the voltage measured across output terminals of a typical battery pack comprised of one or more nickel-cadmium rechargeable battery cells during recharging thereof is plotted as a function of time. Voltage, scaled in terms of volts, is plotted along ordinate axis 320, and time, scaled in terms of seconds, is represented along abscissa axis 324. The resultant curve 328 is formed as the voltage level taken across the battery cells (which is indicative of the energy stored by the cells) increases responsive to continued application of the charging current. Curve 328, referred to as a battery characteristic charge curve, generally increases over time until the battery cells of the battery pack become fully charged at a time and voltage indicated by point 332 on curve 328. It is noted that the battery characteristic charge curve 328 forms the same general shape responsive to application of either the fast charging current to charge the battery cells of a battery pack, or application of the trickle charging current to charge the battery cells of the battery pack. The time period required to recharge the battery cells of a battery pack when the charging current applied thereto is comprised of the trickle charging current is, of course, significantly greater than when the charging current is comprised of the fast charging current. Therefore, battery characteristic charge curve 328 when formed responsive to application of the trickle charging current to the battery cells of the battery pack is significantly expanded along the time axis 324 as compared with a similar curve 328 formed responsive to application of the fast charging current.

The graphical representation of FIG. 4 further illustrates curve portion 336, shown in hatch, formed at the left-hand side of curve 328. Curve portion 336 is representative of a voltage decrease which sometimes occurs upon initiation of application of a charging current to the battery cell of a battery pack. After such initial voltage decrease, continued application of a charging current results in the voltage level taken across the battery cells of the battery pack to increase corresponding to the pattern of curve 328.

Curve 328 further illustrates the decrease in the voltage level across the battery cells responsive to continued application of a charging current to the battery cells after the cells have been fully charged. Suitable selection of the magnitude of the trickle charging current (i.e., when the magnitude of the trickle charging current is a small value, such reduction in voltage level is not evidenced except after an extended period of time, if at all).

Figure 5:
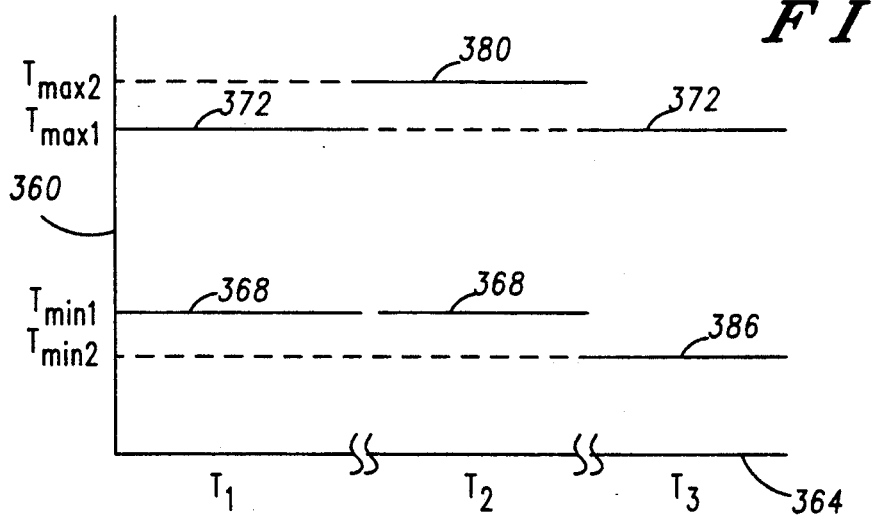
FIG. 5 is a graphical representation of the temperature range within which application of a fast charging current to a battery positioned for recharging thereof is permitted.

Turning now to the graphical representation of FIG. 5, the temperature ranges of the ambient temperature level of the cells of a battery pack within which the battery charging system of the present invention permits initiation of or continuation of application of a fast charging current to the battery cells are graphically represented. Ordinate axis 360 is scaled in terms of a temperature gradient, such as centigrade degrees, and the abscissa axis 364 represents three discrete periods of time, indicated by time periods $T_1$, $T_2$, and $T_3$. The first time period, $T_1$, represents the temperature range of temperature levels of the battery cells of a battery pack within which initiation of application of a fast charging current is permitted to charge the battery cells thereby.

The temperature range is bounded by a minimum temperature level and a maximum temperature level. The minimum temperature level is illustrated in the figure as temperature $T_{min1}$, the value of which defines horizontal line 368. The maximum temperature level is illustrated in the figure as temperature $T_{max1}$, the value of which defines horizontal line 372. When the ambient temperature level of the battery cells of the battery pack is within the range bounded by the minimum and maximum temperature levels, represented by lines 368 and 372, initiation of the application of the fast charging current to the battery cells is permitted. When the ambient temperature level of the battery cells of the battery pack is beyond the range bounded by the minimum and maximum temperature levels, represented by lines 368 and 372, initiation of application of the fast charging current to the battery cells is not permitted; only a trickle charging current is permitted to be applied to the battery cells when the ambient temperature level of the battery cells is beyond the range indicated at the first time period.

The temperature range represented at time period $T_2$, illustrates the range within which the application of a fast charging current is permitted to continue once application of the fast charging current is initiated. The temperature range is bounded by a minimum temperature level and a maximum temperature level. The minimum temperature level at time period $T_2$, is illustrated in the figure as temperature $T_{min1}$, the value of which defines horizontal line 368. The maximum temperature level at time $T_2$, is illustrated in the figure as temperature $T_{max2}$, the value of which defines horizontal line 380. When the ambient temperature level of the battery cells of the battery pack is within the range bounded by the minimum and maximum temperatures, represented by lines 368 and 380, application of the fast charging current to the battery cells is permitted to continue. When the ambient temperature level of the battery cells of the battery pack is beyond the range bounded by the minimum and maximum temperature levels, represented by lines 368 and 380, application of the fast charging current is terminated, and only a trickle charging current is permitted to be applied to the battery cells. The maximum temperature level below which the application of the fast charging current is permitted to continue is increased to prevent termination of fast charging of the battery cells responsive to a temperature increase caused by the application of the fast charging current.

The temperature range represented at time period $T_3$, also illustrates a range within which the application of fast charging current is permitted to continue once application of the fast charging current is initiated. The temperature range is bounded by a minimum temperature level and a maximum temperature level. The minimum temperature level at time period $T_3$ is illustrated in the figure as temperature $T_{min2}$, the value of which defines horizontal line 386. The maximum temperature level is illustrated in the figure as temperature $T_{max1}$, the value of which defines horizontal line 372. When the ambient temperature level of the battery cells of the battery pack is within the range bounded by the minimum and maximum temperatures, represented by lines 386 and 372, application of the fast charging current is permitted to continue. When the ambient temperature level of the battery cells of the battery pack is beyond the range bounded by the minimum and maximum temperatures, represented by lines 386 and 372, application of the fast charging current is terminated, and only a trickle charging current is applied to the battery cells. The minimum temperature level above which application of the fast charging current is permitted to continue is lowered to prevent termination of application of the fast charging current responsive to a temperature decrease occurring during the application of the fast charging current.

The maximum temperature boundary of the range of temperature levels within which application of the fast charging current is permitted to continue is increased (represented at time period $T_2$) responsive to times in which the ambient temperature level of the battery cells is, prior to application of a fast charging current, initially above the maximum temperature level represented by line 372. The minimum temperature boundary of the range of temperature levels within which application of the fast charging current is permitted to continue is decreased (represented at time period $T_3$) when the ambient temperature level of the battery cells is, prior to application of a fast charging current, initially below the minimum temperature level represented by line 368. Both the maximum temperature level and the minimum temperature level may also be simultaneously altered after initiation of application of the fast charging current.

Figure 6:
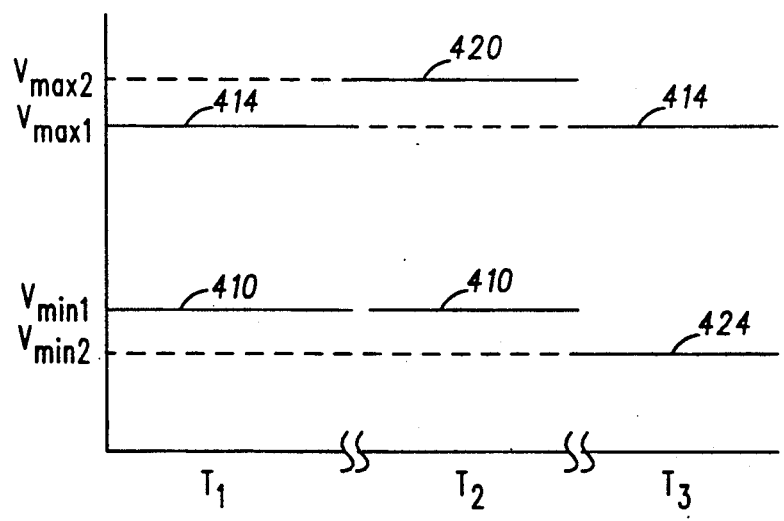
FIG. 6 is a graphical representation similar to that of FIG. 5, but illustrating the voltage ranges within which application of a fast charging current to a battery positioned for recharging thereof is permitted.

The graphical representation of FIG. 6 illustrates the voltage ranges of voltage levels taken across the battery cells of a battery pack within which the battery charging system of the present invention permits initiation or continuation of application of a fast charging current to charge the battery cells of the battery pack thereby. Ordinate axis 400 is scaled in terms of voltage, and the abscissa axis 404 represents three discrete periods of time, indicated by time periods $T_1$, $T_2$, and $T_3$. The first time period, $T_1$, represents the voltage range within which the application of a fast charging current is permitted to be initiated to charge the battery cells of a battery pack thereby. The voltage range is bounded by a minimum voltage level and a maximum voltage level. The minimum voltage level is illustrated in the figure as voltage $V_{min1}$, the value of which defines horizontal line 410. The maximum voltage level is illustrated in the figure as voltage $V_{max1}$, the value of which defines horizontal line 414. When the ambient voltage level across the battery cells of the battery pack is within the range bounded by the minimum and maximum voltages, represented by lines 410 and 414, initiation of application of a fast charging current is permitted. When the ambient voltage level taken across the battery cells of the battery pack is beyond the range bounded by the minimum and maximum voltage levels, represented by lines 410 and 414, application of a fast charging current is not initiated; only a trickle charging current is permitted to be applied to the battery cells when the voltage level taken across the battery cells is beyond the range indicated at the first time period.

The voltage range represented at time period $T_2$ illustrates the range within which the application of fast charging current is permitted to continue once application of the fast charging current is initiated. Again, the voltage range is bounded by a minimum voltage level and a maximum voltage level. The minimum voltage level at time period $T_2$ is illustrated in the figure as voltage $V_{min1}$, the value of which defines horizontal line 410. The maximum voltage level at time $T_2$ is illustrated in the figure as voltage $V_{max2}$, the value of which defines horizontal line 420. When the ambient voltage level taken across the battery cells of the battery pack is within the range bounded by minimum and maximum voltage levels, represented by lines 410 and 420, application of the fast charging current is permitted to continue. When the ambient voltage level taken across the battery cells of the battery pack is beyond the range bounded by the minimum and maximum voltage levels, represented by lines 410 and 420, application of the fast charging current is terminated; only a trickle charging current is permitted to be applied to the battery cells. The maximum voltage level below which application of the fast charging current is permitted to continue is increased to prevent termination of the application of the fast charging current responsive to transient changes in voltage levels.

The voltage ranage represented at time period $T_3$ also illustrates a range within which the application of fast charging current is permitted to continue once the application of the fast charging current is initiated. The voltage range is bounded by a minimum voltage level and a maximum voltage level. The minimum voltage at time period $T_3$ is illustrated in the figure as voltage $V_{min2}$, the value of which defines horizontal line 424. The maximum voltage level at time $T_3$ is illustrated in the figure as $V_{max1}$, the value of which defines line 414. When the voltage level taken across the battery cells of the battery pack is within the range bounded by the minimum and maximum voltage levels, represented by lines 424 and 414, application of the fast charging current is permitted to continue. When the voltage level taken across the battery cells of the battery pack is beyond the range bounded by minimum and maximum voltage levels, represented by lines 424 and 414, application of the fast charging current is terminated; only a trickle charging current is permitted to be applied to the battery cells. The minimum voltage level above which application of the fast charging current is permitted to continue is lowered to prevent termination of application of the fast charging current responsive solely due to transient changes in voltage levels (such as a decrease represented by curve portion 336 of characteristic charging curve 328 of FIG. 4).

The maximum voltage level boundary of the range of voltage levels within which application of the fast charging current is permitted to continue is increased (represented at time period $T_2$) responsive to times in which the voltage level taken across the battery cells is, prior to application of the fast charging current, initially above the maximum voltage level represented by line 414. The minimum voltage level boundary is decreased (represented at time period $T_3$) when the voltage level across the battery cells is, prior to application of the fast charging current, initially the below the minimum voltage level represented by line 410. Both the maximum voltage level and the minimum voltage level may also be simultaneously altered after initiation of application of the fast charging current.

Figure 7:
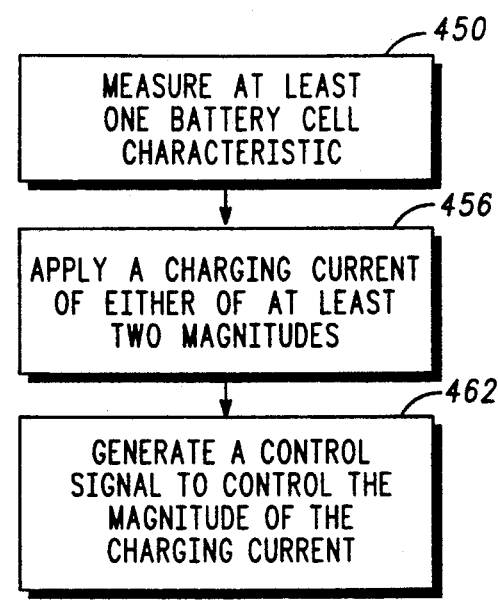
FIG. 7 is a flow diagram illustrating the method steps of the method of the present invention.

Turning now to the flow diagram of FIG. 7, the method steps of the method of the present invention for charging a battery pack having at least one battery cell are shown. First, and as indicated by block 450, at least one battery characteristic of the at least one battery cell is measured. Next, and as indicated by block 456, a charging current of either of at least two magnitudes is applied to at least one battery cell responsive to application of a control signal thereto. Next, and as indicated by block 462, a control signal is generated to control the magnitude of the charging current which is applied to at least one battery cell. The control signal is of a value to cause application of the charging current of the first magnitude (i.e., the fast charging current magnitude) when the battery characteristic is within a first predetermined range. The control signal is of a value to cause application of the charging current of the second magnitude (i.e., the trickle charging current magnitude) when the battery characteristic is beyond the first predetermined range and the battery cell is less than fully charged. The control signal is of a value to change the magnitude of the charging current applied to the at least one battery cell from the second magnitude (i.e., the trickle charging current magnitude) to the first magnitude (i.e., the fast charging current magnitude) when the at least one battery characteristic alters in value to be within the first predetermined range and the battery cell is less than fully charged.

Figure 8:
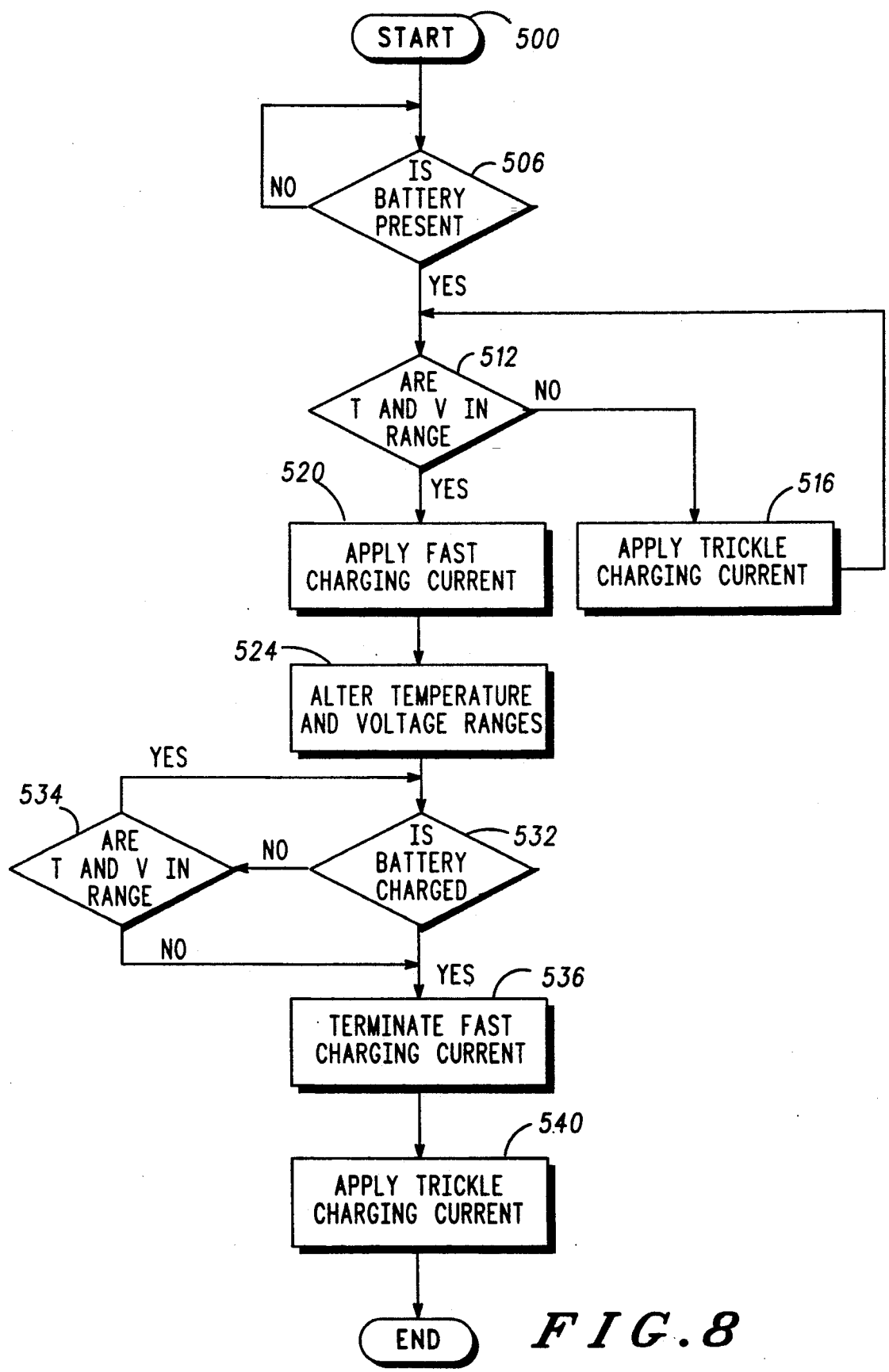
FIG. 8 is a flow diagram of an algorithm embodying the method of the present invention.

Turning now to the flow diagram of FIG. 8, an algorithm embodying the steps of the method of a preferred embodiment of the present invention is shown. The algorithm of FIG. 8 represents the method of the present invention for initiation of application of a charging current to the battery cells of a single battery pack.

After commencement of execution of the algorithm, represented by enter block 500, a determination is made, represented by decision block 506, as to whether a battery pack is positioned to be recharged. If a battery pack is not positioned to be recharged, the NO branch is taken, and application of a charging current is not initiated. If a battery pack is positioned for recharging, the YES branch is taken to decision block 512. Decision block 512 determines whether the temperature and voltage levels of the battery pack are within desired ranges, as graphically described at time period T1 in FIGS. 5 and 6. If either the temperature level of the battery cells of the battery pack, or the voltage across the battery cells of the battery pack are beyond a desired range, the NO branch is taken, and a trickle charging current is applied to the cells of the battery pack, as represented by block 516. If the temperature and voltage levels are within a desired range, the YES branch is taken, application of the fast charging current is initiated, as represented by block 520, and the temperature and voltage ranges are redefined as described hereinabove with respect to FIGS. 5 and 6. If the NO branch is taken from decision block 512 and the trickle charging current is applied to the battery cell of the battery pack, the temperature and voltage levels are continued to be measured. If the temperature and voltage levels alter in values to be within the desired range, the YES branch is taken from decision block 512, and application of the fast charging current is initiated.

Once the application of the fast charging current is initiated and the desired temperature and voltage ranges are altered as shown by block 524, a determination is made as to whether the battery cells of the battery pack are fully charged, as represented by decision block 532. If the battery is not yet fully charged, the NO branch is taken to decision block 534 whereat a determination is made as to whether the temperature and voltage levels are within the allowable ranges to ensure that the temperature and voltage levels of the battery cells of the battery pack are within the desired range, as redefined. If the temperature level or voltage level of the battery cells are altered to be beyond the allowable ranges (as redefined), the NO branch is taken from block 534, and application of the fast charging current is terminated. If the temperature and voltage levels do not exceed the allowable ranges, application of the fast charging current continues until the battery cells become fully charged. Once the battery becomes fully charged, the YES branch is taken from decision block 532, application of the fast charging current is terminated, as indicated by block 536, and application of trickle charging current is initiated, as indicated by block 540.

Figure 9:
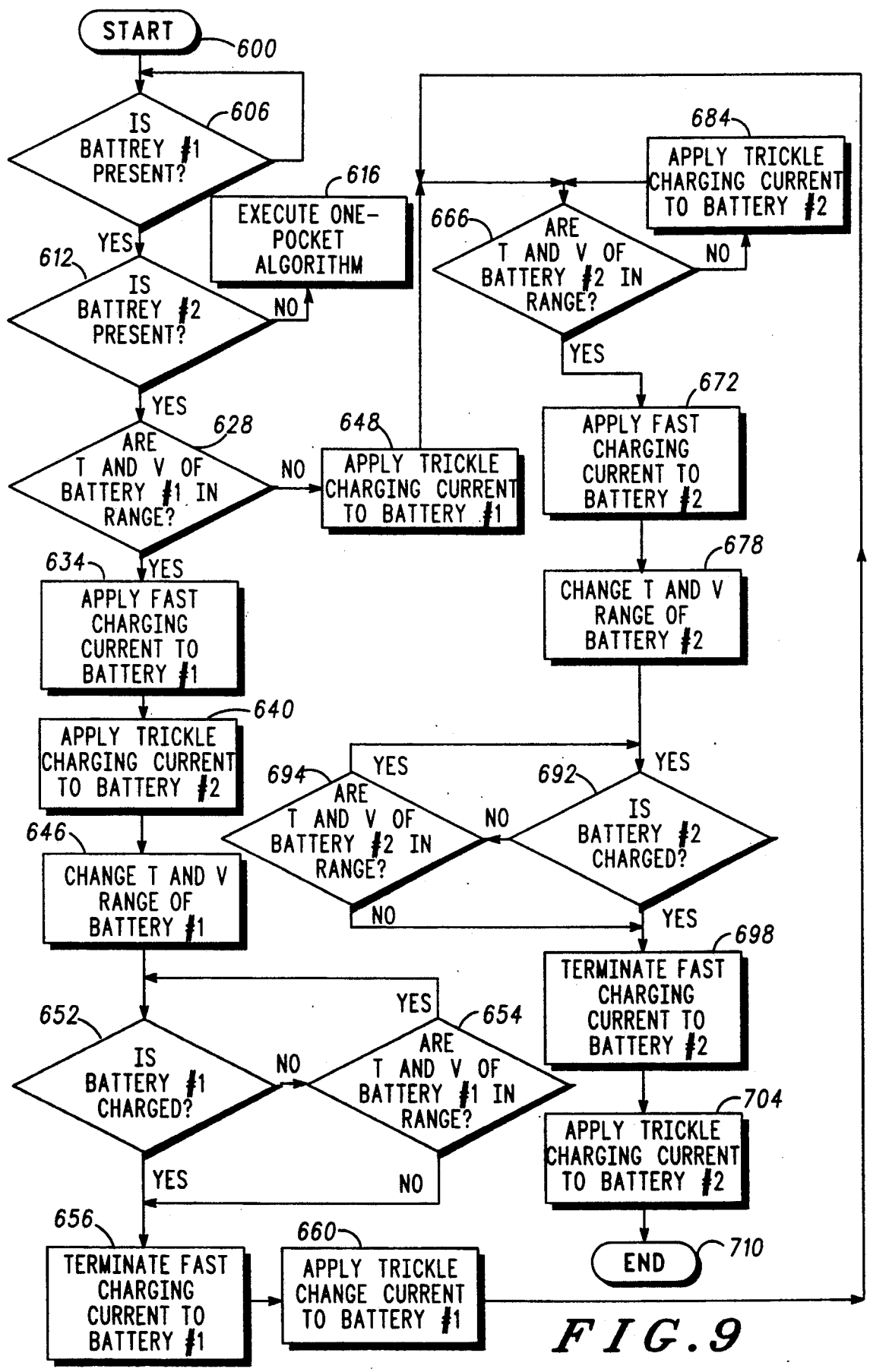
FIG. 9 is a flow diagram of another algorithm embodying the method of the present invention.

Turning now to the flow diagram of FIG. 9, an algorithm embodying the steps of the method of a preferred embodiment of the present invention for charging batteries positioned at a two-pocket battery charger is shown. First, after commencement of execution of the algorithm, as indicated by enter block 600, a determination is made, indicated by decision block 606, as to whether a battery pack is positioned at a first of the battery pockets (referred to as the "priority pocket"). If no battery pack is positioned at the priority battery pocket, the NO branch is taken, and no application of any charging current is initiated. If a battery pack is suitably positioned at the priority pocket, the YES branch is taken from decision block 606 to decision block 612 where a determination is made as to whether a battery is positioned at a second pocket of the two-pocket battery charger. If no battery pack is positioned at the second battery charging pocket, the NO branch is taken to block 616. When the NO branch is taken from decision block 612, a single battery pack is positioned at the two-pocket battery charger to be recharged thereat. The algorithm illustrated in FIG. 8 may be executed to charge the cells of the single battery pack thereby. Block 616 of FIG. 9 indicates such execution of the algorithm of FIG. 8.

If a battery is positioned at the second charging pocket, the YES branch is taken from decision block 612 to decision block 628 whereat a determination is made as to whether the temperature level and voltage level of the battery cells of the battery pack is positioned at the priority charging pocket are within desired ranges. If the temperature and voltage levels are within the desired ranges, the YES branch is taken, application of the fast charging current is initiated, as represented by block 634, a trickle charging current is applied to the battery pack positioned at the second battery charging pocket, as represented by block 640, and the temperature and voltage ranges within which application of the fast charging current is permitted to continue are altered, as represented by block 646. If either the temperature or voltage levels are beyond the desired ranges, the NO branch is taken from decision block 628, and a trickle charging current is applied to the battery cells of the battery pack positioned at the priority pocket, as indicated by block 648.

Next, and as indicated by decision block 652, a determination is made as to whether the battery cells of the battery pack positioned at the priority battery charging pocket are fully charged. If the battery is not yet fully charged, the NO branch is taken to decision block 654 whereat a determination is made as to whether the temperature and voltage levels are within the allowable ranges. When the battery cells of the battery pack positioned at the priority charging pocket are fully charged, the YES branch is taken from block 652, application of the fast charging current is terminated, as represented by block 656, and a trickle charging current is applied to the battery cells of the battery pack positioned at the priority pocket, as represented by block 660.

If the temperature level or voltage level of the battery cells of the battery pack positioned at the priority pocket are beyond desired ranges prior to initiation of application of the fast charging current, if the temperature level or voltage level of the battery cells change to be beyond the allowable ranges during application of the fast charging current, or if the battery is fully charged, branches are taken (either from decision block 628 or block 660) to decision block 666 whereat a determination is made as to whether the temperature level and voltage level of the battery cells of the battery pack positioned at the second battery charging pocket are within desired ranges. If the temperature in voltage levels are within the desired ranges, the YES branch is taken, application of a fast charging current to the battery cell of the battery pack positioned at the second charging pocket is initiated, as indicated by block 672, and the desired temperature and voltage ranges are altered, as indicated by block 678. Next, and as indicated by decision block 692, a determination is made as to whether the cells of the battery pack positioned at the second battery charging pocket are fully charged. If the battery is not yet fully charged, the NO branch is taken to decision block 694. When the battery cells are fully charged, the YES branch is taken from block 692, application of the fast charging current is terminated, as indicated by block 698, a trickle charging current is applied to the battery cells, as indicated by block 704, and execution of the algorithm is terminated, as indicated by exit block 710. If either the temperature level or voltage level of the battery cells of the battery pack positioned at the second battery charging pocket are beyond the desired ranges, the NO branch is taken from block 694, and a trickle charging current is applied to the battery positioned at the second battery charging pocket as represented by block 684.

If application of the fast charging current to the battery cells of the battery pack positioned at the second charging pocketed is initiated, a determination is made, as represented by decision block 692 as whether the battery cells of the battery pack are fully charged.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A battery charging system for charging a battery pack having at least one battery cell, said system comprising:

means for measuring at least one battery characteristic of the at least one battery cell;

means responsive to application of a control signal thereto for applying a charging current of either of at least two magnitudes to the at least one battery cell;

means forming control circuitry for generating said control signal to control thereby the magnitude of the charging current applied to the at least one battery cell of the battery pack wherein the control circuitry generates said control signal: to cause application of the charging current of a first magnitude when the at least one battery characteristic measured by the means for measuring is within a first predetermined range wherein said first predetermined range is defined by an upper boundary comprising a maximum level and a lower boundary comprising a minimum level; to cause application of the charging current of a second magnitude when the at least one battery characteristic measured by the means for measuring is beyond the first predetermined range and the at least one battery cell is less than fully charged; to change the magnitude of the charging current applied to the at least one battery cell from the second magnitude to the first magnitude when the at least one battery characteristic measured by the means for measuring alters in value to be within the first predetermined range, and the battery cell is less than fully charged; to alter at least one of the boundaries defining the first predetermined range thereby to define a second predetermined range in which the charging current of the first magnitude is permitted to continue upon commencement of application of the charging current of the first magnitude; and to terminate application of the charging current of the first magnitude when the at least one battery cell of the battery pack becomes fully charged, or the at least one battery characteristic is of a level beyond the second predetermined range.

2. The battery charging system of claim 1 wherein said battery characteristic comprises voltage levels measured across output terminals of the at least one battery cell of the battery pack.

3. The battery charging system of claim 2 wherein said first predetermined range comprises a range of voltage levels wherein the lower boundary is defined by a minimum voltage level and the upper boundary is defined by a maximum voltage level.

4. The battery charging system of claim 3 wherein said maximum voltage level is of a value corresponding to a voltage level indicative of the at least one battery cell when fully charged.

5. The battery charging system of claim 3 wherein the value of the maximum voltage level comprising the upper boundary of the first predetermined range is increased, and the value of the minimum voltage level comprising the lower boundary of the first predetermine range is decreased upon the commencement of the application of the charging current of the first magnitude to define thereby the second predetermined range.

6. The battery charging system of claim 1 wherein said battery characteristic comprises an ambient temperature level of the at least one battery cell of the battery pack.

7. The battery charging system of claim 6 wherein said first predetermined range comprises a range of temperature levels wherein the lower boundary is defined by a minimum temperature level and the upper boundary is defined by a maximum temperature level.

8. The battery charging system of claim 7 wherein the value of the maximum temperature level comprising the upper boundary of the first predetermined range is increased, and the value of the minimum temperature level comprising the lower boundary of the first predetermined range is decreased upon the commencement of the application of the charging current of the first magnitude to define thereby the second predetermined range.

9. The battery charging system of claim 1 wherein the charging current of the first magnitude comprises a fast charging current magnitude.

10. The battery charging system of claim 1 wherein the charging current of the second magnitude comprises a trickle charging current magnitude.

11. A battery charging system for charging a rechargeable battery pack having a plurality of battery cells, said battery charging system comprising:

means for measuring voltage levels across output terminals of the plurality of battery cells of the battery pack;

means responsive to application of a control signal thereto for applying a charging current of either a fast charging current magnitude or a trickle charging current magnitude to the plurality of battery cells;

means forming control circuitry for generating said control signal to control thereby application of the charging current applied to the plurality of battery cells of the battery pack wherein the control circuitry generates said control signal: to cause application of the fast charging current magnitude when the voltage levels measured across the output terminals of the plurality of battery cells of the battery pack are within a first predetermined range wherein said first predetermined range is defined by an upper boundary comprising a maximum voltage level and a lower boundary comprising a minimum voltage level; to cause application of the trickle charging current magnitude when the voltage levels taken across the output terminals of the plurality of battery cells of the battery pack are beyond the first predetermined range and the plurality of battery cells are less than fully charged; to change the magnitude of the charging current applied to the plurality of battery cells from the trickle charging current magnitude to the fast charging current magnitude when the voltage levels taken across the output terminals of the plurality of battery cells alters in value to be within the first predetermined range, and the plurality of battery cells are less than fully charged; to increase the maximum voltage level and to decrease the minimum voltage level comprising the upper and lower boundaries of the first predetermined range to define thereby a second predetermined range in which the charging current of the first magnitude is permitted to continue upon commencement of application of the charging current of the first magnitude; and to terminate application of the charging current of the first magnitude when the battery cells of the battery pack become fully charged, or the voltage level measured across output terminals of the plurality of battery cells of the battery pack is of a level beyond the second predetermined range.

12. A battery charging system for a multiple-pocket battery charger having at least a first battery charging pocket and a second battery charging pocket permitting a first battery pack comprised of at least one battery cell and a second battery pack also comprised of at least one battery cell to be charged when positioned at the first battery charging pocket and the second battery charging pocket, respectively, said battery charging system comprising:

means for measuring at least one battery characteristic of the at least one battery cell of the first battery pack and at least one battery characteristic of the at least one battery cell of the second battery pack when the first and second battery packs are positioned at the first and second battery charging pockets, respectively;

means, responsive to application of control signals thereto, for applying a charging current of either of at least two magnitudes to the at least one battery cell of the first battery pack positioned at the first battery charging pocket and to the at least one battery cell of the second battery charging pocket; and means forming control circuitry for generating said control signals to control thereby the magnitudes of the charging currents applied to the at least one battery cell of the first battery pack and to the at least one battery cell of the second battery pack wherein the control circuitry generates said control signals: to cause application of the charging current of a first magnitude to the at least one battery cell of the first battery pack and application of the charging current of a second magnitude to the at least one battery cell of the second battery pack when the at least one battery characteristic of the at least one battery cell of the first battery pack is within a first predetermined range wherein said first predetermined range is defined by an upper boundary comprising a maximum level and a lower boundary comprising a minimum level; to cause application of the charging current of the second magnitude to the at least one battery cell of the first battery pack and application of the charging current of the first magnitude to the at least one battery cell of the second battery pack when the at least one battery characteristic of the at least one battery cell of the first battery pack is beyond the first predetermined range and the at least one battery characteristic of the second battery pack is within the first predetermined range; to change the magnitude of the charging current applied to the at least one battery cell of the first battery pack from the second magnitude to the first magnitude when the at least one battery characteristic of the at least one battery cell of the first battery pack alters in value to be within the first predetermined range and the at least one battery cell of the first battery pack is less than fully charged; to alter at least one of the boundaries defining the first predetermined range thereby to define a second predetermined range in which the charging current of the first magnitude is permitted to continue upon commencement of application of the charging current of the first magnitude; and to terminate application of the charging current of the first magnitude when the at least one battery cell of the battery pack becomes fully charged, or the at least one battery characteristic is of a level beyond the second predetermined range.

13. A method for charging a battery pack having at least one battery cell, said method comprising the steps of:

measuring at least one battery characteristic of the at least one battery cell;

applying a charging current of either of at least two magnitudes to the at least one battery cell responsive to application of a control signal thereto; and generating said control signal whereby said control signal is of a value: to cause application of the charging current of the first magnitude when the at least one battery characteristic measured during said step of measuring is within a first predetermined range wherein said first predetermined range is defined by an upper boundary comprising a maximum level and a lower boundary comprising a minimum level; to cause application of the charging current of the second magnitude when the at least one battery characteristic measured during said step of measuring is beyond the first predetermined range and the at least one battery cell is less than fully charged; to change the magnitude of the charging current applied to the at least one battery cell from the second magnitude to the first magnitude when the at least one battery characteristic measured during said step of measuring alters in value to be within the first predetermined range and the at least one battery cell is less than fully charged; to alter at least one of the boundaries defining the first predetermined range thereby to define a second predetermined range in which the charging current of the first magnitude is permitted to continue upon commencement of application of the charging current of the first magnitude; and to terminate application of the charging current of the first magnitude when the at least one battery cell of the battery pack becomes fully charged, or the at least one battery characteristic is of a level beyond the second predetermined range.

14. The method of claim 13 wherein said battery characteristic measured during said step of measuring comprises voltage levels measured across output terminals of the at least one battery cell of the battery pack.

15. The method of claim 14 wherein said first predetermined range comprises a range of voltage levels wherein the lower boundary is defined by a minimum voltage level and the upper boundary is defined by a maximum voltage level.

16. The method of claim 15 wherein the value of the maximum voltage level comprising the upper boundary of the first predetermined range is increased, and the value of the minimum voltage level comprising the lower boundary of the first predetermined range is decreased upon the commencement of the application of the charging current of the first magnitude to define thereby the second predetermined range.

17. The method of claim 13 wherein said battery characteristic measured during said step of measuring comprises an ambient temperature level of the at least one battery cell of the battery pack.

18. The method of claim 17 wherein said first predetermined range comprises a range of temperature levels wherein the lower boundary is defined by a minimum temperature level and the upper boundary is defined by a maximum temperature level.

19. The method of claim 18 wherein the value of the maximum temperature level comprising the upper boundary of the first predetermined range is increased, and the value of the minimum temperature level comprising the lower boundary of the first predetermined range is decreased upon the commencement of the application of the charging current of the first magnitude to define thereby the second predetermined range.

* * * * *